US010502913B2

(12) United States Patent
Harris et al.

(10) Patent No.: US 10,502,913 B2
(45) Date of Patent: Dec. 10, 2019

(54) POLYMERIC COMPOSITIONS FOR OPTICAL FIBER CABLE COMPONENTS

(71) Applicant: DOW GLOBAL TECHNOLOGIES LLC, Midland, MI (US)

(72) Inventors: William J. Harris, Freeport, TX (US); Mohamed Esseghir, Lawrenceville, NJ (US); Gangwei Sun, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/069,388

(22) PCT Filed: Mar. 7, 2016

(86) PCT No.: PCT/CN2016/075773
§ 371 (c)(1),
(2) Date: Jul. 11, 2018

(87) PCT Pub. No.: WO2017/152342
PCT Pub. Date: Sep. 14, 2017

(65) Prior Publication Data
US 2019/0023895 A1 Jan. 24, 2019

(51) Int. Cl.
G02B 6/44 (2006.01)

(52) U.S. Cl.
CPC ............ *G02B 6/443* (2013.01); *G02B 6/441* (2013.01); *C08L 2205/03* (2013.01); *G02B 6/4407* (2013.01)

(58) Field of Classification Search
CPC ...................................................... G02B 6/443
USPC ................................. 385/100, 103, 109, 147
See application file for complete search history.

(56) References Cited

U.S. PATENT DOCUMENTS

| 5,045,401 | A | * | 9/1991 | Tabor | B32B 7/12 |
|---|---|---|---|---|---|
| | | | | | 428/516 |
| 5,705,565 | A | | 1/1998 | Hughes et al. | |
| 6,487,345 | B1 | * | 11/2002 | Dixon | G02B 6/443 |
| | | | | | 385/100 |
| 7,302,143 | B2 | * | 11/2007 | Ginocchio | G02B 6/443 |
| | | | | | 385/100 |
| 7,346,257 | B2 | | 3/2008 | Mumm et al. | |
| 8,913,862 | B1 | * | 12/2014 | Emmerich | G02B 6/4429 |
| | | | | | 385/103 |

(Continued)

FOREIGN PATENT DOCUMENTS

| CN | 1205443 A * | 1/1999 | ............... G02B 6/04 |
|---|---|---|---|
| CN | 102127239 A | 7/2011 | |

(Continued)

OTHER PUBLICATIONS

Huang, Journal of Applied Polymer Science, 2008, vol. 109, 3070-3079.

(Continued)

*Primary Examiner* — Robert Tavlykaev

(57) ABSTRACT

Polymeric compositions comprising a polybutylene terephthalate, an ethylene-based polymer, and a maleated ethylene-based polymer. Optical cable components fabricated from the polymeric composition. Optionally, the polymeric composition can further comprise one or more additives, such as a filler. The optical fiber cable components can be selected from buffer tubes, core tubes, and slotted core tubes, among others.

4 Claims, 2 Drawing Sheets

(56) References Cited

U.S. PATENT DOCUMENTS

| | | | |
|---|---|---|---|
| 9,624,364 B2* | 4/2017 | Schombourg | C08K 5/00 |
| 2005/0256264 A1* | 11/2005 | Suzuki | B32B 27/32 |
| | | | 525/88 |
| 2007/0224423 A1* | 9/2007 | Lee | G02B 6/443 |
| | | | 428/375 |
| 2008/0037940 A1* | 2/2008 | Park | G02B 6/4459 |
| | | | 385/100 |
| 2008/0145009 A1 | 6/2008 | Mumm et al. | |
| 2010/0160497 A1* | 6/2010 | Karjala | C08F 8/00 |
| | | | 524/13 |
| 2013/0287353 A1 | 10/2013 | Molin et al. | |
| 2014/0030520 A1* | 1/2014 | Nakamura | H01B 3/308 |
| | | | 428/368 |
| 2015/0370023 A1 | 12/2015 | Baca et al. | |

FOREIGN PATENT DOCUMENTS

| | | | | |
|---|---|---|---|---|
| CN | 103013060 A | * | 4/2013 | C08L 67/02 |
| CN | 105482190 A | * | 4/2013 | C08L 9/02 |
| CN | 104163972 A | * | 11/2014 | C08L 23/06 |
| CN | 105237964 A | * | 1/2016 | C08L 67/02 |
| JP | H08146261 A | | 6/1996 | |
| WO | 1994/001495 | | 1/1994 | |
| WO | WO 2014/099350 A1 | * | 6/2014 | C08L 23/06 |

OTHER PUBLICATIONS

PCT/CN2016/075773, International Search Report and Written Opinion dated Jul. 21, 2016.

PCT/CN2016/075773, International Preliminary Report on Patentability dated Sep. 20, 2018.

* cited by examiner

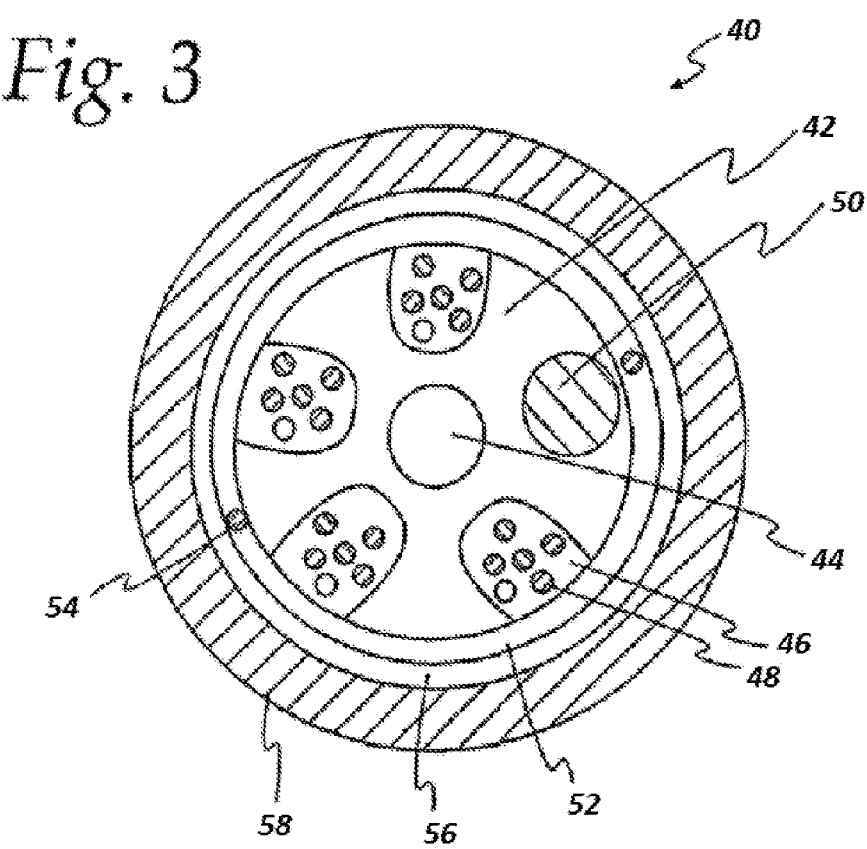

POLYMERIC COMPOSITIONS FOR OPTICAL FIBER CABLE COMPONENTS

FIELD

Various embodiments of the present disclosure relate to polymeric compositions comprising a polybutylene terephthalate, an ethylene-based polymer, and a maleated ethylene-based polymer. Additional embodiments relate to buffer-tube, core-tube, or slotted-core fiber optic cable components made from the polymeric compositions.

INTRODUCTION

Optical fibers efficiently transmit information at high rates and over long distances. These fibers are delicate and need to be protected. In practical application, a fiber optic cable protects the fibers from mechanical damage and/or adverse environmental conditions such as moisture exposure. For example, specific protective components include extruded buffer tubes, core tubes, and slotted core members.

Buffer tubes, also known as loose buffer tubes, are protection components used to house and protect optical fibers, such as in a cable. Typically, these loose buffer tubes are filled with a hydrocarbon gel or grease to suspend and protect the fiber from moisture and have stringent requirements for high crush resistance, resistance to micro-bending, low brittleness temperature, good grease compatibility, impact resistance, and low post-extrusion shrinkage. Still other buffer tubes may be dry-construction buffer tubes that do not employ hydrocarbon gels or grease. Materials used in the manufacture of the buffer tubes include polybutylene terephthalate ("PBT"), high-crystallinity polypropylene, and to a lesser extent high-density polyethylene. Although advances have been made in the field of buffer tubes, improvements are still desired.

SUMMARY

One embodiment is a polymeric composition, comprising:
a polybutylene terephthalate;
an ethylene-based polymer having a density of at least 0.93 g/cm$^3$; and
a maleated ethylene-based polymer having a density of at least 0.93 g/cm$^3$.

BRIEF DESCRIPTION OF THE DRAWINGS

Reference is made to the accompanying drawings in which:

FIG. 3 shows a cross-sectional view of a slotted core optical fiber cable.

DETAILED DESCRIPTION

Figure 1:
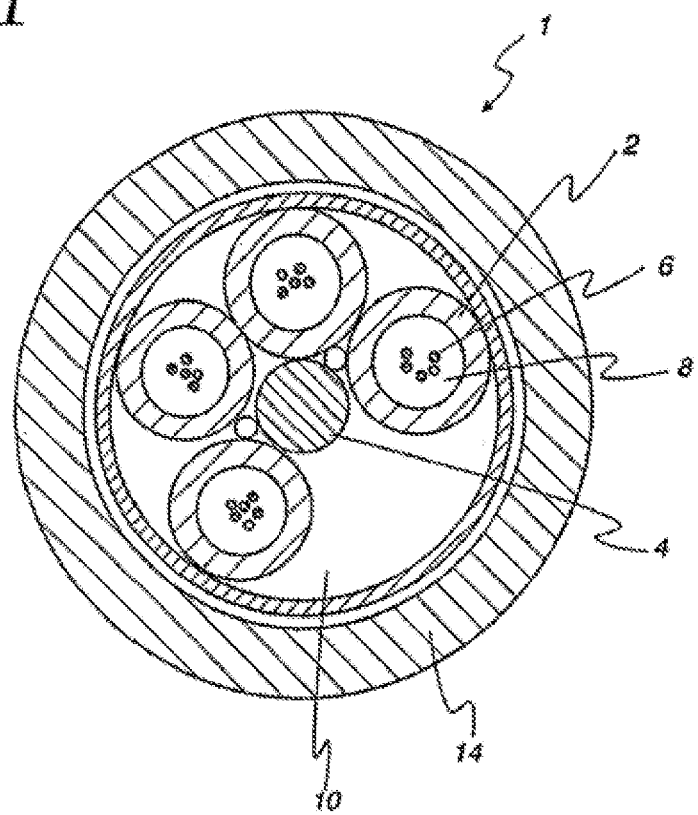
FIG. 1 shows a cross-sectional view of a loose buffer tube optical fiber cable.

Various embodiments of the present disclosure concern polymeric compositions comprising a polybutylene terephthalate ("PBT"), an ethylene-based polymer, and a maleated ethylene-based polymer. Optionally, the polymeric composition can further comprise one or more additives, such as a filler. Such polymeric compositions can be extruded to form optical fiber cable protective components.

Polybutylene Terephthalate

The PBT component of the polymeric composition can be any PBT known or hereafter discovered in the art. The PBT component of the polymeric composition can be prepared by any known or hereafter discovered methods in the art.

In one or more embodiments, the unfilled PBT can have a density in the range of from 1.26 to 1.41 g/cm$^3$, or from 1.30 to 1.35 g/cm$^3$. Polymer densities provided herein are determined according to ASTM International ("ASTM") method D792 at 23° C.

In one or more embodiments, the PBT can have a melt index ($I_2$) in the range of from 5 to 50 grams per 10 minutes ("g/10 min."), from 7 to 15 g/10 min., or from 8 to 10 g/10 min. Melt indices provided herein are determined according to ASTM method D1238. Melt indices for PBT are determined at 250° C. and 2.16 Kg (i.e., $I_2$).

Examples of commercially available PBTs include, but are not limited to, PBT-61008 from Suzhou Yingmao Plastics Company, Jiangsu, China; ULTRADUR™ B6550 from BASF, Ludwigshafen, Germany; CRASTIN™ 6129 NC010 from DuPont, Wilmington, Del., USA; and PBT VALOX™ 176 from Sabic Innovative Plastics, Pittsfield, Mass., USA.

In one or more embodiments, the PBT can be present in the polymeric composition in an amount ranging from 40 to 70 weight percent ("wt %"), from 45 to 70 wt %, from 50 to 70 wt %, or from 55 to 65 wt %, based on the combined weight of the PBT, the ethylene-based polymer, and the maleated ethylene-based polymer. In various embodiments, the PBT can be present in the polymeric composition in an amount ranging from 35 to 70 wt %, from 40 to 65 wt %, or from 45 to 63 wt %, based on the total weight of the polymeric composition.

Ethylene-Based Polymer

As noted above, one component of the polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as catalysts, initiators, solvents, and chain transfer agents.

In an embodiment, the ethylene-based polymer can be an ethylene/alpha-olefin ("α olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a C3-20 (i.e., having 3 to 20 carbon atoms) linear, branched or cyclic α-olefin. Examples of C3-20 α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, molecular weight, molecular weight distributions, densities, etc). If a blend of ethylene-based polymers is employed, the polymers can be blended by any in-reactor or post-reactor process.

The ethylene-based polymer suitable for use herein has a density of at least 0.93 g/cm$^3$. In various embodiments, the ethylene-based polymer can have a density of at least 0.933 g/cm$^3$, at least 0.935 g/cm$^3$, at least 0.937 g/cm$^3$, at least 0.94 g/cm$^3$, at least 0.943 g/cm$^3$, at least 0.945 g/cm$^3$, at least 0.947 g/cm$^3$, or at least 0.95 g/cm$^3$. In one or more embodiments, the ethylene-based polymer can have a density up to 0.97 g/cm$^3$, up to 0.965 g/cm$^3$, or up to 0.96 g/cm$^3$.

In an embodiment, the ethylene-based polymer can be a linear-low-density polyethylene ("LLDPE"). LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a melt index ($I_2$) ranging from 1 to 20 g/10 min., or from 3 to 8 g/10 min. Melt indices for ethylene-based polymers are determined at 190° C. and 2.16 Kg (i.e., $I_2$).

In an embodiment, the ethylene-based polymer can be a medium-density polyethylene ("MDPE"). MDPEs are ethylene-based polymers having densities generally ranging from 0.926 to 0.940 g/cm$^3$. However, for the present application, if an MDPE is employed it should have a density of at least 0.93 g/cm$^3$. In various embodiments, the MDPE can have a density ranging from 0.930 to 0.939 g/cm$^3$. The MDPE can have a melt index ($I_2$) ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min.

In one or more embodiments, the ethylene-based polymer can be a high-density polyethylene ("HDPE"). The high-density polyethylene suitable for use herein can be any high-density polyethylene known or hereafter discovered in the art. As known to those of ordinary skill in the art, HDPEs are ethylene-based polymers having densities of at least 0.940 g/cm$^3$. In an embodiment, the HDPE can have a density from 0.940 to 0.970 g/cm$^3$, from 0.940 to 0.965 g/cm$^3$, or from 0.945 to 0.965 g/cm$^3$. The HDPE can have a peak melting temperature of at least 124° C., or from 124 to 135° C. The HDPE can have a melt index ($I_2$) ranging from 0.1 grams per 10 minutes ("g/10 min."), or 0.2 g/10 min., or 0.3 g/10 min., or 0.4 g/10 min., up to 66.0 g/10 min., or 20.0 g/10 min., or 15.0 g/10 min., or, 10.0 g/10 min. or 5.0 g/10 min., or 1.0 g/10 min., or 0.5 g/10 min. Also, the HDPE can have a polydispersity index ("PDI") in the range of from 1.0 to 30.0, or in the range of from 2.0 to 15.0, as determined by gel permeation chromatography.

The HDPE suitable for use herein can be either unimodal or bimodal. As used herein, "unimodal" denotes an HDPE having a molecular weight distribution ("MWD") such that its gel permeation chromatography ("GPC") curve exhibits only a single peak with no discernible second peak, or even a shoulder or hump, relative to such single peak. In contrast, as used herein, "bimodal" means that the MWD in a GPC curve exhibits the presence of two component polymers, such as by having two peaks or where one component may be indicated by a hump, shoulder, or tail relative to the peak of the other component polymer. In various embodiments, the HDPE is unimodal. In other embodiments, the HDPE is bimodal.

Preparation methods for unimodal HDPEs are well known in the art. Any methods known or hereafter discovered for preparing a unimodal HDPE having the desired properties may be employed for making the unimodal HDPE. A suitable preparation method for making the unimodal HDPE can be found, for example, in U.S. Pat. No. 4,303,771 or 5,324,800.

An example of a commercially available unimodal HDPE includes, but is not limited to, DGDL-3364NT, available from The Dow Chemical Company, Midland, Mich., USA.

When the HDPE employed is a bimodal HDPE, such HDPE can comprise a first polymeric component and a second polymeric component. In various embodiments, the first component can be an ethylene-based polymer; for example, the first component can be a high-molecular-weight ethylene homopolymer or ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight.

The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decease, and 4-methyl-1-pentene. In an embodiment, the alpha-olefin comonomers can be selected from the group consisting of propylene, 1-butene, 1-hexene, and 1-octene. In other embodiments, the alpha-olefin comonomers can be selected from the group consisting of 1-hexene and 1-octene.

The first component of the bimodal HDPE can have a density in the range of from 0.915 to 0.940 g/cm$^3$, from 0.920 to 0.940 g/cm$^3$, or from 0.921 to 0.936 g/cm$^3$. The first component can have a melt index ($I_{21.6}$) in the range of from 0.5 to 10 g/10 min., from 1 to 7 g/10 min., or from 1.3 to 5 g/10 min. The first component can have a molecular weight in the range of from 150,000 to 375,000 g/mol, from 175,000 to 375,000 g/mol, or from 200,000 to 375,000 g/mol.

The second polymeric component of the bimodal HDPE can be an ethylene-based polymer; for example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 percent by weight of one or more alpha-olefin comonomers. The second component can comprise at least 99 wt % of ethylene, or in the range of from 99.5 to 100 wt % of ethylene, based on the weight of the second component.

The second component of the bimodal HDPE can have a density in the range of from 0.965 to 0.980 g/cm$^3$, or from 0.970 to 0.975 g/cm$^3$. The second component can have a melt index ($I_2$) in the range of from 50 to 1,500 g/10 min., from 200 to 1,500 g/10 min., or from 500 to 1,500 g/10 min. The second component can have a molecular weight in the range of 12,000 to 40,000 g/mol, from 15,000 to 40,000 g/mol, or from 20,000 to 40,000 g/mol.

Preparation methods for bimodal HDPEs are well known in the art. Any methods known or hereafter discovered for preparing a bimodal HDPE having the desired properties may be employed for making the bimodal HDPE. A suitable preparation method for making bimodal HDPE can be found, for example, in U.S. Patent Application Publication No. 2009-0068429, paragraphs [0063] to [0086].

An example of a commercially available bimodal HDPE includes, but is not limited to, DMDA-1250NT, available from The Dow Chemical Company, Midland, Mich., USA.

In an embodiment, the ethylene-based polymer can comprise a combination of any two or more of the above-described ethylene-based polymers.

In one or more embodiments, the ethylene-based polymer can be present in the polymeric composition in an amount ranging from 25 to 55 weight percent ("wt %"), from 25 to 50 wt %, from 30 to 45 wt %, or from 30 to 40 wt %, based on the combined weight of the PBT, the ethylene-based polymer, and the maleated ethylene-based polymer. In various embodiments, the ethylene-based polymer can be present in the polymeric composition in an amount ranging from 25 to 60 wt %, from 30 to 55 wt %, or from 35 to 52 wt %, based on the total weight of the polymeric composition.

Examples of suitable commercially available ethylene-based polymers include, but are not limited to AXELERON™ CX 6944 NT, DGDA-2300 NT, and DMDA-1250 NT, each available from The Dow Chemical Company, Midland, Mich., USA.

Maleated Ethylene-Based Polymer

As noted above, the polymeric composition further comprises a maleated ethylene-based polymer. As used herein, the term "maleated" indicates a polymer (e.g., an ethylene-based polymer) that has been modified to incorporate a maleic anhydride monomer. Maleic anhydride can be incorporated into the ethylene-based polymer by any methods known or hereafter discovered in the art. For instance, the maleic anhydride can be copolymerized with ethylene and other monomers (if present) to prepare an interpolymer having maleic anhydride residues incorporated into the polymer backbone. Alternatively, the maleic anhydride can be graft-polymerized to the ethylene-based polymer. Techniques for copolymerizing and graft polymerizing are known in the art.

In one or more embodiments, the maleated ethylene-based polymer is an ethylene-based polymer having maleic anhydride grafted thereon. In such embodiments, the ethylene-based polymer prior to being maleated can be any of the ethylene-based polymers described above. In various embodiments, the starting ethylene-based polymer can be selected from a linear-low density polyethylene, a medium-density polyethylene, and a high-density polyethylene. In one or more embodiments, the starting ethylene-based polymer can be a high-density polyethylene.

The maleated ethylene-based polymer has a density of at least 0.93 g/cm$^3$. In various embodiments, the maleated ethylene-based polymer can have a density of greater than 0.93 g/cm$^3$, at least 0.933 g/cm$^3$, at least 0.935 g/cm$^3$, at least 0.937 g/cm$^3$, at least 0.94 g/cm$^3$, at least 0.943 g/cm$^3$, at least 0.945 g/cm$^3$, at least 0.947 g/cm$^3$, or at least 0.95 g/cm$^3$. In one or more embodiments, the maleated ethylene-based polymer can have a density up to 0.97 g/cm$^3$, up to 0.965 g/cm$^3$, or up to 0.96 g/cm$^3$.

In various embodiments, the maleated ethylene-based polymer can have a melt index ranging from 0.1 to 10 g/10 min., from 0.2 to 8 g/10 min., or from 0.5 to 5 g/10 min.

The maleated ethylene-based polymer can have a maleic anhydride content of at least 0.25 wt %, or in an amount ranging from 0.25 to 2.5 wt %, or from 0.5 to 1.5 wt % based on the total weight of the maleated ethylene-based polymer. Maleic anhydride concentrations are determined by titration analysis, FTIR analysis or any other appropriate method. One titration method takes dried resin and titrates with 0.02N KOH to determine the amount of maleic anhydride. The dried polymers are titrated by dissolving 0.3 to 0.5 grams of maleated polymer in about 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

In one or more embodiments, the maleated ethylene-based polymer can be present in the polymeric composition in an amount ranging from greater than 0 to 5 wt %, from 0.01 to 2.5 wt %, or from 0.1 to 1 wt %, based on the combined weight of the PBT, the ethylene-based polymer, and the maleated ethylene-based polymer. In various embodiments, the maleated ethylene-based polymer can be present in the polymeric composition in an amount ranging from greater than 0 to 5 wt %, from 0.01 to 4 wt %, from 0.1 to 3 wt %, or from 0.5 to 1.5 wt %, based on the total weight of the polymeric composition.

Examples of suitable commercially available maleated ethylene-based polymer include, but are not limited to, AMPLIFY™ TY1053H, AMPLIFY™ GR204, and AMPLIFY™ GR205 available from The Dow Chemical Company, Midland, Mich., USA; BYNEL™ 4000 series and FUSABOND™ P series products, available from DuPont, Wilmington, Del., USA; OREVAC™ grafted polyethylenes, available from Arkema, Colombes, France; and POLYBOND™ 3000 series, available from Addivant, Danbury, Conn., USA.

Additives

In various embodiments, the polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. In various embodiments, the filler or fillers can have a median size or $d_{50}$% of less than 20 μm, less than 10 μm, or less than 5 μm. Suitable fillers may also be surface treated to facilitate wetting or dispersion in the polymeric composition. Specific examples of suitable fillers include, but are not limited to, calcium carbonate, silica, quartz, fused quartz, talc, mica, clay, kaolin, wollastonite, feldspar, aluminum hydroxide, carbon black, and graphite. Fillers may be included in the polymeric composition in an amount ranging from 2 to 30 wt %, or from 5 to 30 wt % based on the total weight of the polymeric composition.

In various embodiments, a nucleating agent can be employed in the polymeric composition. Examples of suitable nucleating agents include ADK NA-11, available commercially from Asahi Denim Kokai, and HYPERFORM™ HPN-20E, available from Milliken Chemical. Persons of ordinary skill in the art can readily identify other useful nucleating agents. The nucleating agents can be included in the polymeric composition in amounts ranging from 0.08 to 0.3 wt %, from 0.09 to 0.25 wt %, or from 0.1 to 0.22 wt % based on the total polymeric composition weight.

When employed, the hydrocarbon oil can be present in the polymeric compositions in an amount ranging from 0.2 to 10 parts per hundred resin ("phr"), or from 0.3 to 3.0 phr based on 100 weight parts of all polymer components present in the polymeric composition. Higher-molecular-weight hydrocarbon oils are more preferable than low-molecular-weight hydrocarbon oils. In various embodiments, the hydrocarbon oil can have a viscosity greater than 400 centistokes as measured by ASTM D-445. Additionally, the hydrocarbon oil can have a specific gravity between 0.86 and 0.90 as measured by ASTM D-1250. Also, the hydrocarbon oil can have a flash point greater than 300° C. as measured by ASTM D-92. Furthermore, the hydrocarbon oil can have a pour point greater than −10° C. as measured by ASTM D-97. Moreover, the hydrocarbon oil can have an aniline point between 80 and 300° C. as measured by ASTM D-611.

The polymeric compositions may also contain other types of additives. Representative additives include, but are not limited to, antioxidants, cross-linking co-agents, cure boosters and scorch retardants, processing aids, coupling agents, ultraviolet stabilizers (including UV absorbers), antistatic agents, additional nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 phr or less to 20 phr or more based on 100 weight parts of all polymer components present in the polymeric composition.

Suitable UV light stabilizers include hindered amine light stabilizers ("HALS") and UV light absorber ("UVA") additives. Representative UVA additives include benzotriazole types such as Tinuvin 326 and Tinuvin 328 commercially available from Ciba, Inc. Blends of HAL's and UVA additives are also effective.

Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphorites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

Compounding

In one or more embodiments, the components of the polymeric composition disclosed herein can be added to a batch or continuous mixer for melt blending. The components can be added in any order or first preparing one or more masterbatches for blending with the other components. Additives are usually blended with one or more other components before being added to the bulk resins and/or filler. In one embodiment, the additives can be added directly to the compounding line without the use of previously prepared masterbatches. Typically, melt blending is conducted at a temperature above the highest melting polymer but lower than the maximum compounding temperature of 285° C. The melt-blended composition can then either be delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

The polymeric composition can exhibit a notched Izod impact strength at −20° C. of at least 19 Joules per meter ("Jim"), at least 20 J/m, at least 25 J/m, at least 30 J/m, at least 35 J/m, at least 40 J/m, or at least 45 J/m. In various embodiments, the polymeric composition can exhibit a notched Izod impact strength up to 80 J/m, up to 75 J/m, up to 70 J/m, or up to 67 J/m. Notched Izod impact strength is determined according to the procedure described in the Test Methods section, below.

The polymeric composition can exhibit a Young's modulus in the range of from 1,100 to 2,400 megapascals ("MPa"), from 1,200 to 2,350 MPa, or from 1,300 to 2,300 MPa. In certain embodiments, such as when the polymeric composition is intended for use in loose buffer tubes that may be in contact with a filling compound (e.g., an optic cable grease or gel), the polymeric composition can exhibit a Young's modulus in the range of from 1,100 to 1,700 megapascals ("MPa"), from 1,200 to 1,700 MPa, or from 1,300 to 1,650 MPa. In other embodiments, such as when the polymeric composition is intended for dry-construction buffer tubes, the polymeric composition can exhibit a Young's modulus in the range of from 1,900 to 2,400 MPa, from 1,950 to 2,350 MPa, or from 2,000 to 2,300 MPa. Young's modulus is determined according to the procedure described in the Test Methods section, below.

The polymeric composition can exhibit a maximum tensile stress in the range of from 30 to 43 MPa, from 31 to 39

MPa, or from 32 to 38 MPa. Maximum tensile stress is determined according to the procedure described in the Test Methods section, below.

In various embodiments, particularly in embodiments where the polymeric composition is intended for use in buffer tubes containing a hydrocarbon filling compound, the polymeric composition can exhibit a weight increase of less than 3 wt %, less than 2.8 wt %, less than 2.6 wt %, or less than 2.4 wt % when immersed in LT410A (a fiber-optic-cable buffer-tube filling compound) at a depth of 40 mils and maintained in an air temperature of 80° C. for a period of 16 days, as further described in the Test Methods section, below. LT410A is composed of at least about 70 wt % mineral oil and up to about 10 wt % styrene-butadiene-styrene block copolymer, and is commercially available from Honghui Corp., China.

After aging in LT410A in the manner described above, the polymeric composition can exhibit a grease-aged Young's modulus in the range of from 1,000 to 1,600 MPa, from 1,000 to 1,550 MPa, or from 1,050 to 1,550 MPa, as determined by the process described in the Test Methods section, below.

After aging in LT410A in the manner described above, the polymeric composition can exhibit a grease-aged maximum tensile strength in the range of from 27 to 39 MPa, from 28 to 38 MPa, or from 29 to 38 MPa, as determined by the process described in the Test Methods section, below.

Optical Fiber Cable

In various embodiments, an optical fiber cable can be prepared that includes at least one extruded optical protective component made from the polymer compositions described herein and incorporating at least one optical fiber transmission medium.

A cross-sectional view of a common loose buffer tube optical fiber cable design is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more buffer tube positions 10 to maintain cable geometry. The cable jacket 14 is generally fabricated from a polyethylene-based material.

The buffer tubes 2 are optionally filled with an optic cable grease or gel 8. Various gel compounds are available commercially, a number of which are hydrocarbon-based greases incorporating hydrocarbon oils. Others are polymer based and use a low viscosity polymer formulated with hydrocarbon oils and other additives for even lower viscosity for ease of filling. These greases and gels provide the suspension and protection needed in the immediate environment surrounding the fibers, including eliminating air space. This filling compound (also referred to as "gel" or "grease") provides a barrier against water penetration, which is detrimental to the optic transmission performance.

In either oil-based grease or polymer formulated with oil for lower viscosity, the hydrocarbon oils are typically low-molecular-weight hydrocarbon oils, which can be absorbed into polymeric buffer tubes. Absorption typically adversely affects the tube's mechanical properties, such as flexural modulus and crush resistance. A decrease in crush resistance renders the optic fibers more prone to mechanical stress, thereby permitting an increase in signal attenuation and increasing the possibility of catastrophic failure. Thus, good retention of modulus and crush resistance along with minimal oil absorption, commonly referred to as "grease compatibility," are important performance characteristics for polymeric materials to be used for making extruded optical protective component.

Many other buffer tube cable designs are possible. The size and materials of construction for the central strength and tensile member, the dimensions and number of buffer tubes, and the use of metallic armors and multiple layers of jacketing material are among the design elements.

Figure 2:
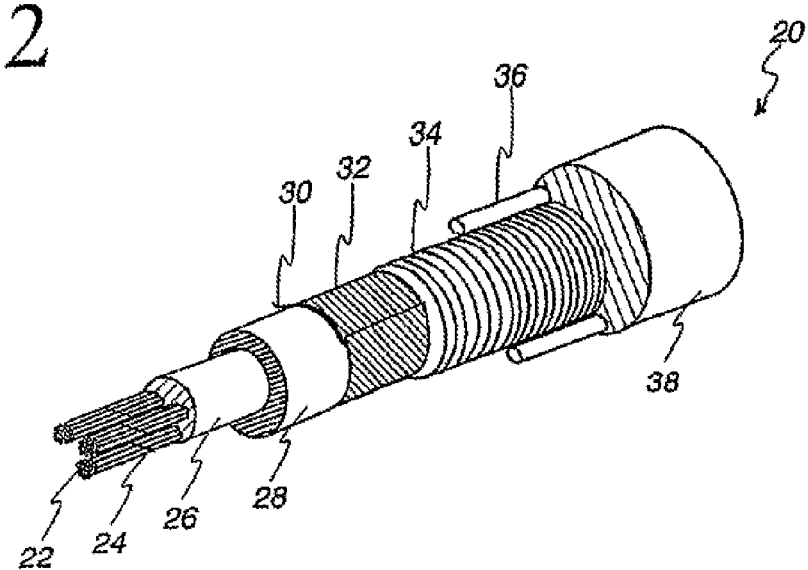
FIG. 2 shows a partial cutaway view of a core tube optical fiber cable.

A partial cutaway view of a typical core-tube optical fiber cable, also known as "central tube," is illustrated in FIG. 2. Bundles 24 of the optical fibers 22 are positioned near the center of the optical cable 20 within a central, cylindrical core tube 28. The bundles are embedded in a filling material 26. Water blocking tape 32 surrounds the ripcords 30, which are on the surface of the core tube. A corrugated, coated steel cylinder 34 surrounds the tape to protect the bundles. Wire strength members 36 provide the cable with strength and stiffness. A jacket 38, which is generally fabricated from a polyethylene-based material, surrounds all of the components. In this design, the mechanical functions are incorporated into the outer sheathing system composed of the core tube, polyolefin jacketing layers, tensile and compressive strength members, metallic armors, core wraps, water blocking components, and other components.

A core tube is typically larger in diameter than a buffer tube to accommodate bundles of fibers or the use of ribbon components containing the optic fibers. Color-coded binders are typically used to bundle and identify the fibers. A core tube can contain water blocking grease or super-absorbent polymer elements surrounding the optic fiber components. The optimal material characteristics for a core tube component are often similar to those of a buffer tube application.

A cross-sectional view of a typical slotted-core cable design is shown in FIG. 3. The optical fiber cable 40 includes a jacket 58 and a slotted core 42, having a central member 44. The central member prevents buckling and controls axial shrinkage of the extruded slotted core profile shape. The jacket and the slotted core are typically made from a polyolefin-based material.

The slotted core has slots 46 in which optical fibers 48 are located. A filler rod 50 also may occupy one or more slots. A water-blocking layer 52, which may have one or more ripcords 54, surrounds the slotted core 42. A dielectric strength member layer 56 surrounds the water-blocking layer.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and grease are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post-extrusion shrinkage does not result in excessive slack in the optic fiber components.

The extruded optical protective components, along with other components, such as central components, armors, and wraps, are then subsequently processed in one or more steps to produce the finished cable construction. This typically includes processing on a cabling line where the components are assembled with a fabricating extruder/crosshead then used to apply the polymeric jacketing.

TEST METHODS

Density

Determine density according to ASTM D792 at 23° C.

Melt Index @ 190° C.

Melt index for polyolefins, or $I_2$, is measured in accordance with ASTM D1238, condition 190° C./2.16 kg, and is reported in grams eluted per 10 minutes. For polybutylene terephthalate, same conditions are utilized but with a temperature of 250° C.

Specimen Preparation

Specimens (S1-S6 and CS1-CS11) for impact strength, Young's tensile modulus, tensile stress, and grease resistance are prepared by first drying blended materials (or PBT alone) in a vacuum oven at 70° C. for 16 hours, and subsequently molded on a Carver press at 255° C. (except for polyethylene, in which case the Carver press is set at 190° C.) for 3 minutes at 3,000 psi, 3 minutes at 10,000 psi, 1 minute at 20,000 psi, and then cooled under pressure between water-cooled platens.

Specimens (S7-S13 and CS12-CS15) for impact strength, Young's tensile modulus, and tensile stress are prepared via injection molding. Prior to injection molding, compound pellets are dried using a desiccant dryer at 80° C. for 10 hours. The injection molding is conducted on a FANUC, ϕ28 machine. The process conditions are summarized in Tables 1 and 2, below.

TABLE 1

Injection molding conditions of ASTM D638 Type I tensile bar

|  | CS12-CS15 | S7-S13 |
| --- | --- | --- |
| Mold temperature (° C.) | 50 | 50 |
| Barrel temperature (° C.) | 50-170-200-200-200-200 | 60-230-250-250-250-250 |
| Injection speed (mm/s) | 30 | 30 |
| Injection time (s) | 1.775 | 1.775 |
| Holding pressure (Mpa) | 65//30 | 50//30 |
| Holding time (s) | 15//1 | 8//1 |
| Cooling time (s) | 22 | 22 |

TABLE 1-continued

Injection molding conditions of ASTM D638 Type I tensile bar

|  | CS12-CS15 | S7-S13 |
| --- | --- | --- |
| Screw R.P.M. (rpm) | 60 | 60 |
| Back pressure (Mpa) | 5 | 5 |
| Transition position (mm) | 14 | 14 |
| Metering stroke (mm) | 64 + 3 | 64 + 3 |
| Cushion (mm) | 5.5 | 8.6 |

TABLE 2

Injection molding conditions of ASTM D256 Izod impact bar

|  | CS12-CS15 | S7-S13 |
| --- | --- | --- |
| Mold temperature (° C.) | 50 | 50 |
| Barrel temperature (° C.) | 50-170-200-200-200-200 | 60-230-250-250-250-250 |
| Injection speed (mm/s) | 52.8 | 52.8 |
| Injection time (s) | 0.556 | 0.556 |
| Holding pressure (Mpa) | 35 | 40//15 |
| Holding time (s) | 20 | 8//1 |
| Cooling time (s) | 12 | 13 |
| Screw R.P.M. (rpm) | 60 | 60 |
| Back pressure (Mpa) | 5 | 5 |
| Transition position (mm) | 12 | 12 |
| Metering stroke (mm) | 38 + 3 | 38 + 3 |
| Cushion (mm) | 4.9 | 5.6 |

Notched Izod Impact Strength

Determine notched Izod impact strength according to ASTM D256. Notched Izod impact strength is determined at −20° C. on bars having a thickness of about 0.115 to about 0.125 inches.

Young's Modulus

Determine Young's modulus according to ASTM D1708 for microtensile bars testing (Samples S1-S6 and CS1-CS11) or ASTM D638 Type I Tensile testing (Samples S7-S13 and CS12-CS15). Young's modulus is measured for fresh samples as well as select samples aged in LT410A optical grease at 80° C. for 16 days in the manner described below for determining grease resistance.

Maximum Tensile Stress

Determine maximum tensile stress according to ASTM D1708 or ASTM D638 Type I on tensile bars having a thickness of about 0.072 inches or 0.123 inches respectively. Maximum tensile stress is measured for fresh samples as well as select samples aged in LT410A optical grease at 80° C. for 16 days in the manner described below for determining grease resistance.

Weight Gain (Grease Resistance)

The optical grease used for these studies is LT410A. Determine gel absorption by measuring the weight gain of each sample with time. Five tensile bars for each material or composition are weighed and then immersed on one side in the LT410A optical grease at a depth of 40 mils and held in an 80° C. air oven for 16 days. The tensile bars are wiped clean and then reweighed to calculate the amount of grease uptake.

Shrinkage

Determine shrinkage of extruded samples after aging at room temperature (21° C.). At least six (6) samples are measured for each material. Four-foot test specimens are prepared using a steel V channel to keep the samples straight and a ruler used for marking initial length measurements. The conductors are then stretched by clamping one end down of the conductor and drawing or pulling the other end of the conductor to separate the polymer tube from the copper. The resulting polymer tubes are aged for one (1) day at 21° C. The sample lengths are measured at the 1-day time and again at the 7-day time. The aged specimens are placed in the V-channel and the change in length measured using a caliper instrument with +/−0.0005 inch resolution. The average shrinkage value is reported. Separately, six (6), one-foot long specimens per sample are aged at 95° C. for four (4) hours and measured for shrinkage using the same method.

MATERIALS

The following materials are employed in the Examples, below.

PBT-61008 is a polybutylene terephthalate ("PBT") having a density of 1.34 g/cm$^3$ and a melt index of 8.24 g/10 min. at 250° C., which is commercially available from Suzhou Yingmao Plastics Company, Jiangsu, China.

DGDA-2300 NT is a unimodal high-density polyethylene ("HDPE") having a density of 0.945 g/cm$^3$ and a melt index ($I_2$) of 0.8 g/10 min. at 190° C., which is commercially available from The Dow Chemical Company, Midland, Mich., USA.

DGDA-6944 NT is a unimodal HDPE having a density of 0.965 g/cm$^3$ and a melt index ($I_2$) of 8.0 g/10 min. at 190° C., which is commercially available from The Dow Chemical Company, Midland, Mich., USA.

DMDA-1250 NT is a bimodal HDPE having a density of 0.955 g/cm$^3$ and a melt index ($I_2$) of 1.5 g/10 min. at 190° C. DMDA-1250 NT is commercially available from The Dow Chemical Company, Midland, Mich., USA.

DOWLEX™ 2035 is an ethylene/1-octene linear-low-density polyethylene ("LLDPE") having a density of 0.919 g/cm$^3$ and a melt index of 6.0 g/10 min., which is commercially available from The Dow Chemical Company, Midland, Mich., USA.

AMPLIFY™ GR 216 is a maleic-anhydride-grafted linear-low-density ethylene/octene copolymeric elastomer having a density of 0.875 g/cm$^3$, a melt index of 1.3 g/10 min., and a maleic anhydride content of 0.79 wt %, which is commercially available from The Dow Chemical Company, Midland, Mich., USA.

AMPLIFY™ TY 1053H is a maleic-anhydride-grafted HDPE having a density of 0.958 g/cm$^3$, a melt index of 2.0 g/10 min., and a maleic anhydride content of greater than 1.0 wt %, which is commercially available from The Dow Chemical Company, Midland, Mich., USA.

MAH-g-DNDA-1082 NT 7 is a maleic-anhydride-grafted LLDPE. Prior to grafting, the ethylene/1-hexene LLDPE (DNDA-1082 NT 7) has a density of 0.933 g/cm$^3$ and a melt index ($I_2$) of 155 g/10 min., and is commercially available from The Dow Chemical Company, Midland, Mich., USA. Maleic anhydride grafting of the DNDA-1082 NT 7 is performed by radical grafting of maleic anhydride in twin screw extruder according to the process described in U.S. Pat. No. 7,897,689, column 69, lines 17 to 33. The resulting MAH-g-DNDA-1082 NT 7 has a density of 0.93 g/cm$^3$, a melt index of 2.5 g/10 min., and a maleic anhydride content of 1 wt %.

MAH-g-INFUSE™ 9807 is a maleic-anhydride-grafted olefin block copolymer. Prior to grafting, the olefin block copolymer has a density of 0.866 g/cm$^3$ and a melt index ($I_2$) of 15 g/10 min., and is commercially available from The Dow Chemical Company, Midland, Mich., USA. Maleic anhydride grafting of the olefin block copolymer is performed by radical grafting of maleic anhydride in twin screw extruder according to the process described in U.S. Pat. No. 7,897,689, column 69, lines 17 to 33. The resulting MAH-g-INFUSE™ 9807 has a density of 0.86 g/cm$^3$, a melt index of 3 g/10 min., and a maleic anhydride content of 1 wt %.

AMPLIFY™ EA 101 is an ethylene-ethyl acrylate copolymer having a density of 0.931 g/cm$^3$, a melt index ($I_2$) of 6.0 g/10 min., and a comonomer content of 18.5%, which is commercially available from The Dow Chemical Company, Midland, Mich., USA.

LOTADER™ AX8900 is a random terpolymer of ethylene, acrylic ester, and glycidyl methacrylate having a density of 0.94 g/cm$^3$, a melt index ($I_2$) of 6.0 g/10 min., a methyl acrylate content of 24 wt %, and a glycidyl methacrylate content of 8 wt %, which is commercially available from Arkema S.A., Colombes, France.

OPTIFIL™ JS is a surface-treated calcium carbonate having a mean particle size of 1 micron and a loose bulk density (ASTM C-110) of 30 lbs/ft$^3$, which is commercially available from Huber Engineered Materials, Atlanta, Ga., USA.

HYPERFORM™ HPN-20E is a nucleating agent that is a calcium salt of 1,2-cyclohexanedicarboxylic acid and zinc stearate, which is commercially available from Milliken Chemical, Spartanburg, S.C., USA.

NA-11A is a nucleating agent with the chemical name sodium 2,2'-methylene-bis-(4,6-di-tert-butylphenyl)phosphate (CAS No. 85209-91-2), which is commercially available from ADEKA Corporation, Tokyo, Japan.

LT410A is a buffer-tube filling compound primarily composed of mineral oil and styrene-butadiene-styrene block copolymer, which is commercially available from Honghui Corp., China.

IRGANOX™ 1010 is a sterically hindered phenolic antioxidant having the chemical name pentaerythritol tetrakis (3-(3,5-di-tert-butyl-4-hydroxyphenyl)propionate), which is commercially available from BASF, Ludwigshafen, Germany.

IRGAFOS™ 168 is a hydrolytically stable phosphite processing stabilizer having the chemical name tris(2,4-ditert-butylphenyl)phosphite, which is commercially available from BASF, Ludwigshafen, Germany.

EXAMPLES

Example 1

(Comparative)

Prepare eight comparative samples (CS1-CS8) using the formulations provided in Table 3, below. All Comparative Samples having two or more components are prepared by blending all components in either a Haake Rheomix 600P or 3000P with pneumatic ram and roller rotors. The blends are melt mixed using a temperature set point of 232.5° C. The materials are added to the mixer at 10 rpm and the speed is stepwise increased to 60 rpm over 3 minutes. The materials are then fluxed at 60 rpm for an additional 6.5 minutes. The resulting blend is removed from the mixer.

TABLE 3

Compositions of CS1-CS8

|  | CS1 | CS2 | CS3 | CS4 | CS5 | CS6 | CS7 | CS8 |
|---|---|---|---|---|---|---|---|---|
| PBT-61008 (PBT) (wt %) | 63.5 | 68.1 | 63.5 | 48.7 | 63.5 | 63.5 | 63.5 | 64.0 |
| DGDA-2300 NT (HDPE) (wt %) | 36.5 | 26.9 | 31.5 | 46.3 | 31.5 | 31.5 | 31.5 | — |
| DOWLEX 2035 (LLDPE) (wt %) | — | — | — | — | — | — | — | 31.0 |
| AMPLIFY GR216 (MAH-g-POE) (wt %) | — | 5.0 | 5.0 | 5.0 | — | — | — | — |
| AMPLIFY EA101 (EEA) (wt %) | — | — | — | — | 5.0 | — | — | — |
| LOTADER AX8900 (wt %) | — | — | — | — | — | 5.0 | — | — |
| MAH-g-INFUSE 9807 (wt %) | — | — | — | — | — | — | 5.0 | — |
| AMPLIFY TY1053H (MAH-g-HDPE) (wt %) | — | — | — | — | — | — | — | 5.0 |
| Total | 100 | 100 | 100 | 100 | 100 | 100 | 100 | 100 |

Analyze CS1-CS8 according to the Test Methods provided above. The results are provided in Table 4, below.

TABLE 4

Properties of CS1-CS8

|  | CS1 | CS2 | CS3 | CS4 | CS5 | CS6 | CS7 | CS8 |
|---|---|---|---|---|---|---|---|---|
| Notched Izod @ −20° C. (J/m) | 26.3 | 88.1 | 83.0 | 68.4 | 22.3 | UT* | 88.5 | 66.1 |
| Grease Resistance (wt %) | 0.50 | 2.50 | 2.27 | 12.43 | 1.00 | 5.13 | 5.59 | 0.62 |
| Young's modulus (MPa) | 1297 | 1031 | 1011 | 743 | 1016 | UT | 1002 | 886 |
| Young's modulus (grease-aged) (MPa) | 1332 | 869 | 871 | 243 | 873 | UT | 830 | 849 |
| Maximum tensile stress (MPa) | 29.0 | 33.5 | 32.1 | 22.4 | 27.4 | UT | 30.2 | 25.8 |
| Maximum tensile stress (grease-aged) (MPa) | 29.7 | 31.7 | 29.9 | 12.5 | 24.2 | UT | 21.6 | 26.9 |

*Sample was so brittle that testing was not possible.

In addition, analyze three further Comparative Samples. CS9 is solely composed of PBT; CS10 is solely composed of DGDA-2300 NT (HDPE), and CS11 is solely composed of DGDA-6944 NT (HDPE). The results are provided in Table 5, below.

TABLE 5

Properties of CS9-CS11

|  | CS9 | CS10 | CS11 |
|---|---|---|---|
| Notched Izod @ −20° C. (J/m) | 43 | 45.7 | 68.6 |
| Grease Resistance (wt %) | 0.02 | 4.38 | 4.63 |
| Young's modulus (MPa) | 1818 | 850 | 1460 |
| Young's modulus (grease-aged) (Mpa) | 1839 | 546 | 875 |
| Maximum tensile stress (Mpa) | 58.6 | 23.1 | 30.5 |
| Maximum tensile stress (grease-aged) (Mpa) | 65.4 | 21.6 | 25.5 |

Looking at the results provided in Tables 4 and 5, it can be seen that blends of only PBT and HDPE (CS1) are brittle, as indicated by relatively lower notched Izod impact strength, but exhibit good grease resistance. Adding either AMPLIFY™ EA101 (CS5) or LOTADER™ AX8900 (CS6) still results in brittle materials, while adding maleated LLDPE or LDPE (CS2-CS4, and CS7) improves toughness but yields poor grease resistance.

Example 2

Prepare six Samples (S1-S6) using the blending procedure provided above in Example 1 and the formulations provided below in Table 6.

TABLE 6

Compositions of S1-S6

|  | S1 | S2 | S3 | S4 | S5 | S6 |
|---|---|---|---|---|---|---|
| PBT-61008 (PBT) (wt %) | 63.5 | 63.5 | 63.0 | 55.7 | 63.5 | 63.0 |
| DGDA-2300 NT (HDPE) (wt %) | 31.5 | 34.0 | — | — | — | — |
| DGDA-6944 NT (HDPE) (wt %) | — | — | 32.0 | 32.7 | 35.5 | 34.5 |
| AMPLIFY TY1053H (MAH-g-HDPE) (wt %) | 5.0 | 2.5 | 5.0 | 5.0 | 1.0 | — |
| MAH-g-DNDA 1082 NT 7 (wt %) | — | — | — | — | — | 2.5 |
| OTPIFIL JS (CaCO₃) (wt %) | — | — | — | 6.6 | — | — |
| Total | 100 | 100 | 100 | 100 | 100 | 100 |

Analyze S1-S6 according to the Test Methods provided above. The results are provided in Table 7, below.

TABLE 7

Properties of S1-S6

|  | S1 | S2 | S3 | S4 | S5 | S6 |
|---|---|---|---|---|---|---|
| Notched Izod @ −20° C. (J/m) | 67.3 | 62.1 | 47.3 | 44.5 | 62.1 | 57.8 |
| Grease Resistance (wt %) | 2.34 | 0.13 | 1.35 | 1.61 | 0.29 | 0.49 |
| Young's modulus (MPa) | 1335 | 1313 | 1350 | 1379 | 1618 | 1487 |
| Young's modulus (grease-aged) (MPa) | 1169 | 1157 | 1125 | 1087 | 1510 | 1444 |
| Maximum tensile stress (MPa) | 37.6 | 33.7 | 32.7 | 30.1 | 38.2 | 36.6 |
| Maximum tensile stress (grease-aged) (MPa) | 36.8 | 34.5 | 31.7 | 28.9 | 38.0 | 34.9 |

Looking at the results in Table 7, compositions prepared with higher-density ethylene-based polymer and maleated ethylene-based polymer exhibit improved modulus retention after grease aging and retained notched Izod impact strength.

Example 3

(Comparative)

Prepare five additional Comparative Samples (CS12-CS16) according to the formulations provided in Table 8, below, and the following process. PBT/HDPE blends are prepared on a Leistritz 28 co-rotating intermeshing 48/1 L/D, 27-mm twin-screw extruder. Key parameters of the machine include the screw having a screw flight depth of 4.5 mm, a 120 kg/h maximum output, a 106 Nm maximum shaft torque, and a 29 KW drive with a maximum of 1200 RPM. The extruder is equipped with 12 temperature control zones including the die. The temperature profile is as follows: cooled/160/200/235/235/235/235/235/235/235/235/240° C. An underwater pelletizer with a 16-hole die is used for compounded pellets. For CS12, CS13, and CS16, all components are dry blended prior to feeding to the main feeder port through a K-Tron loss-in-weight feeder. For CS14 and CS15, all ingredients except OTPIFIL™ JS (CaCO₃) are dry blended first and then fed using a K-Tron loss-in-weight feeder and OTPIFIL™ JS (CaCO$_3$) is fed by another separate K-Tron feeder. The RPM of extruder is set on 150 and the output is 10 kg/h.

TABLE 8

Compositions of CS12-CS16

|  | CS12 | CS13 | CS14 | CS15 | CS16 |
|---|---|---|---|---|---|
| PBT-61008 (PBT) (wt %) | — | — | — | — | 100 |
| DGDA-6944 NT (HDPE) (wt %) | — | 98.2 | — | 92.2 | — |
| DMDA-1250 NT (HDPE) (wt %) | 98.2 | — | 92.2 | — | — |
| AMPLIFY TY1053H (MAH-g-HDPE) (wt %) | 1.0 | 1.0 | 1.0 | 1.0 | — |
| OTPIFIL JS (CaCO$_3$) (wt %) | — | — | 6.0 | 6.0 | — |
| NA-11A (nucleating agent) (wt %) | 0.2 | 0.2 | 0.2 | 0.2 | — |
| IRGANOX 1010 (antioxidant) (wt %) | 0.4 | 0.4 | 0.4 | 0.4 | — |
| IRGAFOS 168 (antioxidant) (wt %) | 0.2 | 0.2 | 0.2 | 0.2 | — |
| Total | 100 | 100 | 100 | 100 | 100 |

Dry the formulations overnight at 105° C. and extrude them through a wire-coating die on individual 9-gauge (0.114-inch diameter) copper wires using the following extruder process conditions:

TABLE 9

Wire Extrusion Conditions for CS12-CS16

| Sample | Zone 1 (° C.) | Zone 2 (° C.) | Zone 3 (° C.) | Zone 4 (° C.) | Pressure (PSI) | Speed (RPM) | Melt Temp. (° C.) | Takeup (Ft/min.) | Diameter (in.) |
|---|---|---|---|---|---|---|---|---|---|
| CS12 | 180 | 200 | 220 | 220 | 900 | 25 | 227 | 9.0 | 0.114 |
| CS13 | 180 | 200 | 220 | 220 | 300 | 25 | 226 | 9.0 | 0.114 |
| CS14 | 180 | 200 | 220 | 220 | 800 | 25 | 230 | 9.0 | 0.114 |
| CS15 | 180 | 200 | 220 | 220 | 550 | 25 | 225 | 9.0 | 0.114 |
| CS16 | 230 | 230 | 250 | 240 | 2400 | 25 | 246 | 7.0 | 0.114 |

Analyze CS12-CS16 according to the procedures provided in the Test Methods section, above. The results are provided in Table 10, below.

TABLE 10

Properties of CS12-CS16

|  | CS12 | CS13 | CS14 | CS15 | CS16 |
|---|---|---|---|---|---|
| Notched Izod @ −20° C. (J/m) | 73.2 | 49.1 | 43.7 | 37.8 | NT |
| Young's modulus (MPa) | 1434 | 1906 | 1514 | 2010 | NT |
| Maximum tensile stress (MPa) | 24.3 | 28.6 | 24.6 | 28.6 | NT |
| Tube Extrusion | Yes | Yes | Yes | Yes | Yes |
| Shrinkage 1 day at 21° C. | 0.43 | 0.39 | 0.37 | 0.38 | 0.24 |
| Shrinkage 7 days at 21° C. | 0.65 | 0.48 | 0.54 | 0.42 | 0.36 |
| Shrinkage 4 hours at 95° C. | 2.26 | 1.65 | 2.00 | 1.48 | 1.56 |

NT—Not tested, test specimens were not prepared for measurements

Example 4

Prepare seven additional Samples (S7-S13) according to the formulations provided in Table 11, below, and the compounding process described in Example 3, above.

TABLE 11

Compositions of S7-S13

|  | S7 | S8 | S9 | S10 | S11 | S12 | S13 |
|---|---|---|---|---|---|---|---|
| PBT-61008 (PBT) (wt %) | 62.7 | 54.96 | 54.96 | 52.49 | 46.90 | 45.41 | 45.41 |
| DGDA-6944 NT (HDPE) (wt %) | 35.50 | 36.60 | — | 45.71 | 51.30 | 46.15 | — |
| DMDA-1250 NT (HDPE) (wt %) | — | — | 36.60 | — | — | — | 46.15 |
| AMPLIFY TY1053H (MAH-g-HDPE) (wt %) | 1.00 | 1.00 | 1.00 | 1.00 | 1.00 | 1.00 | 1.00 |
| OTPIFIL JS (CaCO$_3$) (wt %) | — | 6.64 | 6.64 | — | — | 6.64 | 6.64 |
| NA-11A (nucleating agent) (wt %) | 0.20 | 0.20 | 0.20 | 0.20 | 0.20 | 0.20 | 0.20 |
| IRGANOX 1010 (antioxidant) (wt %) | 0.40 | 0.40 | 0.40 | 0.40 | 0.40 | 0.40 | 0.40 |
| IRGAFOS 168 (antioxidant) (wt %) | 0.20 | 0.20 | 0.20 | 0.20 | 0.20 | 0.20 | 0.20 |
| Total | 100 | 100 | 100 | 100 | 100 | 100 | 100 |

Dry the formulations overnight at 105° C. and extrude them through a wire-coating die on individual 9-gauge (0.114-inch diameter) copper wires using the following extruder process conditions:

TABLE 12

Wire Extrusion Conditions for S7-S13

| Sample | Zone 1 (° C.) | Zone 2 (° C.) | Zone 3 (° C.) | Zone 4 (° C.) | Pressure (PSI) | Speed (RPM) | Melt Temp. (° C.) | Takeup (Ft/min.) | Diameter (in.) |
|---|---|---|---|---|---|---|---|---|---|
| S7 | 230 | 240 | 250 | 225 | 1700 | 30 | 240 | 7.0 | 0.114 |
| S8 | 230 | 240 | 250 | 240 | 1500 | 30 | 252 | 7.5 | 0.114 |
| S9 | 230 | 240 | 250 | 240 | 1400 | 30 | 252 | 8.5 | 0.114 |
| S10 | 230 | 240 | 250 | 240 | 1100 | 30 | 251 | 7.5 | 0.114 |
| S11 | 230 | 240 | 250 | 240 | 1200 | 30 | 252 | 8.0 | 0.114 |
| S12 | 230 | 240 | 250 | 240 | 1400 | 30 | 253 | 8.5 | 0.114 |
| S13 | 230 | 240 | 250 | 240 | 1450 | 30 | 248 | 8.5 | 0.114 |

Analyze S7-S13 according to the procedures provided in the Test Methods section, above. The results are provided in Table 13, below.

TABLE 13

Properties of S7-S12

|  | S7 | S8 | S9 | S10 | S11 | S12 | S13 |
|---|---|---|---|---|---|---|---|
| Notched Izod @ −20° C. (J/m) | 41.3 | 41.9 | 33.0 | 27.7 | 19.5 | 31.1 | 30.8 |
| Young's modulus (MPa) | 2148 | 2284 | 2118 | 2088 | 2034 | 2254 | 2039 |
| Maximum tensile stress (MPa) | 42.2 | 38.2 | 39.2 | 37.2 | 35.1 | 34.4 | 36.0 |
| Tube Extrusion | Yes | Yes | Yes | Yes | Yes | Yes | Yes |
| Shrinkage 1 day at 21° C. | 0.25 | 0.21 | 0.21 | 0.22 | 0.26 | 0.17 | 0.18 |
| Shrinkage 7 days at 21° C. | 0.52 | 0.37 | 0.37 | 0.35 | 0.50 | 0.41 | 0.37 |
| Shrinkage 4 hours at 95° C. | 1.82 | 1.39 | 1.65 | 1.22 | 1.30 | 1.22 | 1.74 |

As can be seen by comparing the results of Tables 9 and 13, wire samples prepared with blends of PBT, HDPE, and a maleic-anhydride-grafted HDPE provide significantly reduced shrinkage compared to samples containing only HDPE and a maleic-anhydride-grafted HDPE.

The invention claimed is:

1. A polymeric composition, comprising:
   60 weight percent to 70 weight percent of a polybutylene terephthalate;
   25 weight percent to 40 weight percent of an ethylene-based polymer having a density of at least 0.945 g/cm$^3$; and
   0.5 weight percent to 5 weight percent of a maleated ethylene-based polymer having a density of at least 0.93 g/cm$^3$,
   wherein the polymeric composition exhibits:
      a grease-aged Young's modulus in the range of from 1,000 to 2,400 MPa;
      a notched Izod impact strength at −20° C. of at least 40 J/m; and
      a weight increase of less than 2 weight percent when immersed in LT410A optical grease at a depth of 40 mils and maintained at an air temperature of 80° C. for a period of 16 days.

2. The polymeric composition of claim 1, wherein said polymeric composition further comprises one or more fillers in an amount ranging from 2 to 30 weight percent, based on the entire weight of the polymeric composition.

3. An extruded optical cable protective component comprising the polymeric composition of claim 1.

4. An optical fiber cable, comprising:
   (a) the extruded optical fiber cable protective component of claim 3; and
   (b) at least one optical fiber transmission medium.

* * * * *